Patented Jan. 3, 1928.

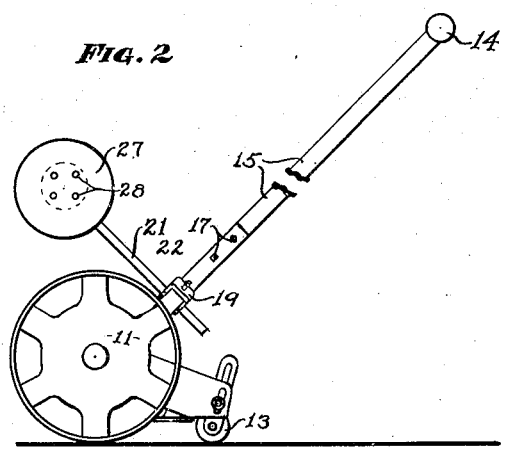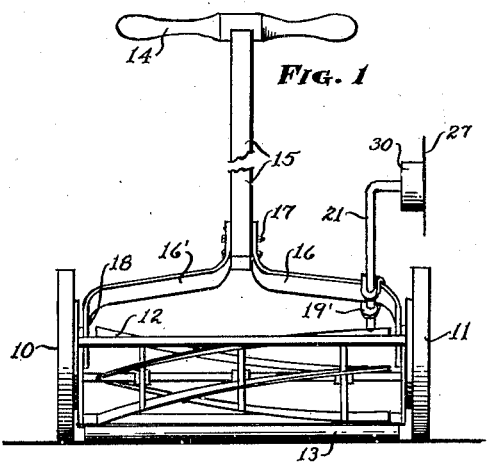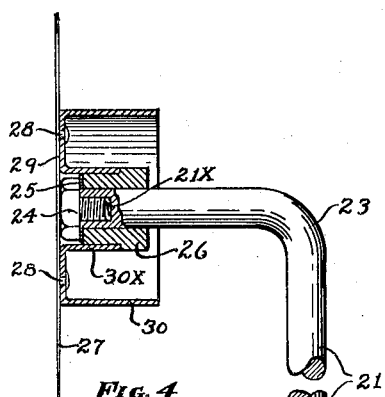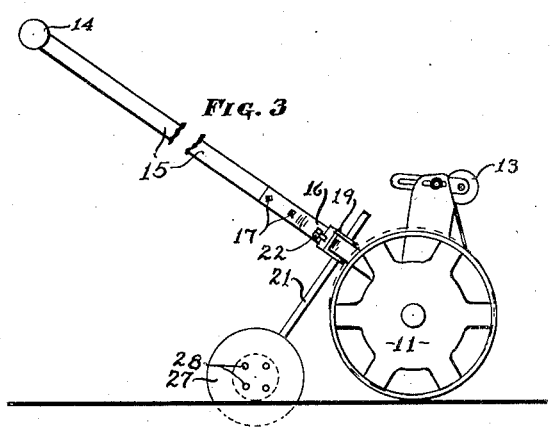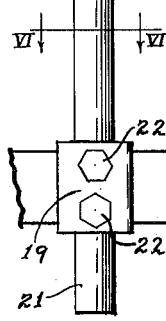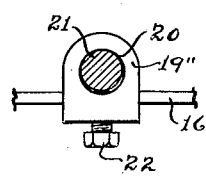

1,654,574

UNITED STATES PATENT OFFICE.

WILLIAM W. BROWN, OF WICHITA, KANSAS.

EDGE TRIMMER FOR LAWNS.

Application filed February 23, 1927. Serial No. 170,272.

The invention relates to a disc-like cutting tool for trimming the edges of lawns, especially useful adjacent sidewalks, curbs and the like. The invention is in effect a combination tool since it is attachable to a lawn mower which becomes not only the source of the motion imparted to the device but lends its own weight and rigidity as well as adaptability for the purpose of controlling and positioning the tool in proper relationship to the sod to be severed.

In the drawings, Fig. 1 is a front view of a lawn mower of the usual type in its position for cutting grass; upon the frame of the lawn mower is seen attached my improved tool arranged in an elevated position over the machine or as best seen in the side elevation Fig. 2. Fig. 3 represents the composite machine seen in Fig. 2 tipped to elevate the rear roller of the machine and position the disc for cutting operations. Fig. 4 is a detail of the elements of the invention partly in section. Fig. 5 is a side view of the clamping means. Fig. 6 is a sectional view taken along the line VI—VI Fig 4 and looking in the direction of the arrows. Similar numerals of reference indicate corresponding parts throughout all the figures of the drawings.

Referring to the drawings; the lawn mower is provided with the usual wheels 10, 11; cutting knives 12; roller 13; handle 14—15 carrying the curved arm elements 16, 16' bolted to the handle as at 17 and pivotally attached as at 18 to frame elements of the lawn mower.

In the position seen in Fig. 2 the lawn mower is positioned to cut the grass in the usual manner. A U-shaped element 19 has its leg elements 19' and 19'' perforated as at 20 through which to pass the rod 21. Bolts 22 are screwed through threaded holes in the element 19. The member 19 has previously been positioned on the member 16, the rod 21 passing through the openings 20 so that the tightening of the bolts 22 against one side of the bar 16 tends to tighten the rod 21 against the bar 16 in any predetermined adjusted position. The outer portion of the rod 21 is bent as at 23 at right angles. The cutting disc is carried by this outer end portion of the rod 21 as seen in Fig. 4.

The end $21^x$ is threaded as seen to receive the bolt 24 while a washer 25 surrounds the rod 21 adjacent the underside of the bolt head 24 as illustrated. At 26 is seen a hub element rotatable upon the shaft 21. A cutting disc 27 shown substantially in contact with the bolt 24 is riveted as at 28 to the side face or base element 29 of the wheel like element 30 whose inner hub portion is rigid with the hub element 26 as at $30^x$. Thus the combined hub elements 26—$30^x$ are free to rotate upon the end of rod 21. The bolt 24 is screwed up tight in the assembly prior to the final riveting at 28 and the assembly is locked in position though rotatable in such position. The bolt 24 does not unscrew itself since the disc 27 turns in one direction in use.

After the cutting of the lawn as in Fig. 2 it is then desired to trim the edge thereof, for instance adjacent a sidewalk. The handle 14 is pulled rearwardly from that illustrated in Fig. 2 to the position seen in Fig. 3 thus lifting the roller 13 off the ground. In this position movement of the wheels 10 and 11 do not actuate the knives 12. The diameter of the wheel 30 and the diameter of the disc 27 is such that the wheel 30 runs on the ground as a depth gauge element controlling the penetration of the disc 27 as shown. It will be noted that the disc 27 in Fig. 1 is adjustable from or towards the outer face of the wheel 11. Thus I use the weight of the lawn mower as a factor in lawn edging operations, while the wheel 11 serves as a side gauge element and the pivoted handle 14 enables the operator to raise and lower the disc to override obstructions as perceived. The device is readily disconnected from the lawn mower when not necessary for use.

Such modifications may be employed as lie within the scope of the appended claim.

Having fully described my invention what I now claim as new and desire to secure by Letters Patent is:

In combination as a lawn tool; a lawn mower; a rod, means for adjustably clamping said rod to an arm element of the lawn mower; said rod terminating in a bent end portion threaded for bolt engagement; a hub element rotatable upon the end of the rod, said hub carrying a wheel as a gauge element; bolt and washer means engaged with the rod; and a disc without the bolt means riveted to said gauge wheel, said disc being normally carried directly over one of the lawn mower wheels.

In testimony whereof I affix my signature.

WILLIAM W. BROWN.